Aug. 13, 1929.  H. L. JOHNSTON  1,724,598
APPARATUS FOR PREPARING FOODSTUFFS
Filed Nov. 16, 1923  4 Sheets-Sheet 2
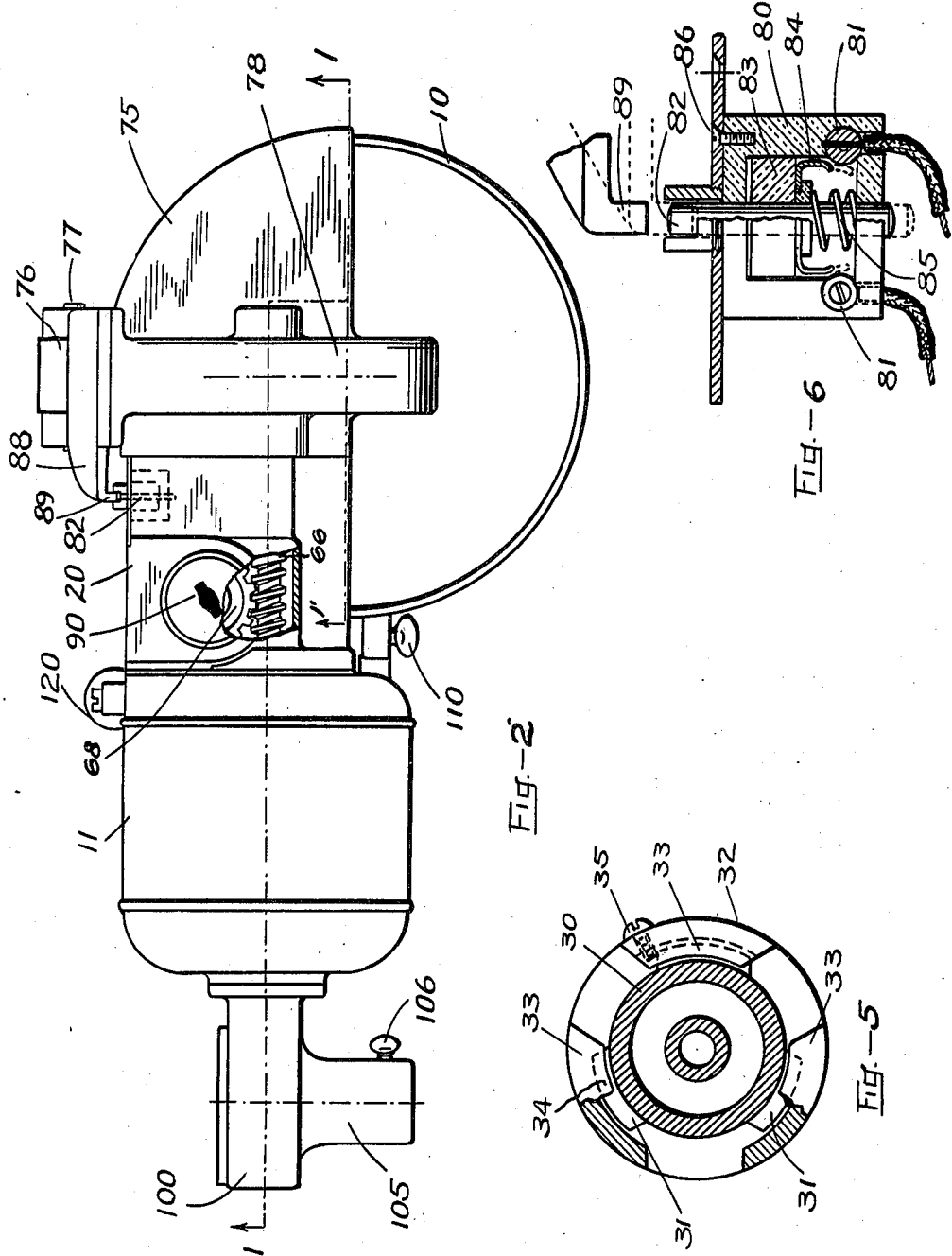
INVENTOR.
Hubert L. Johnston
BY
ATTORNEYS.

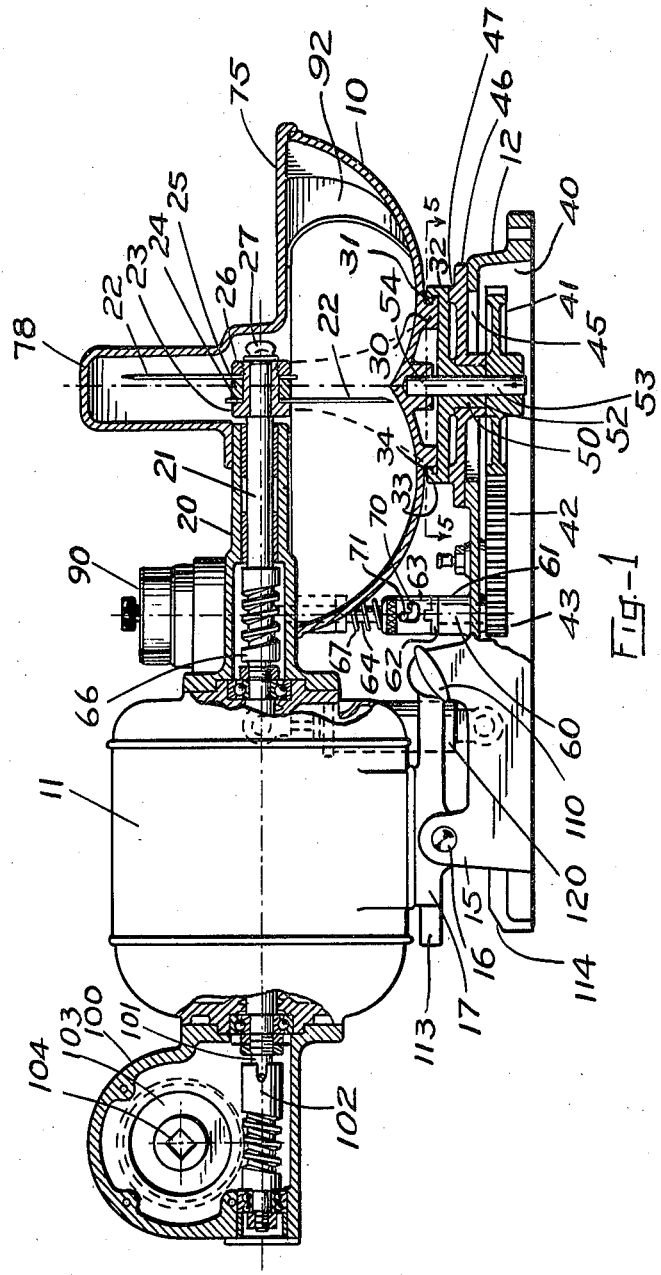

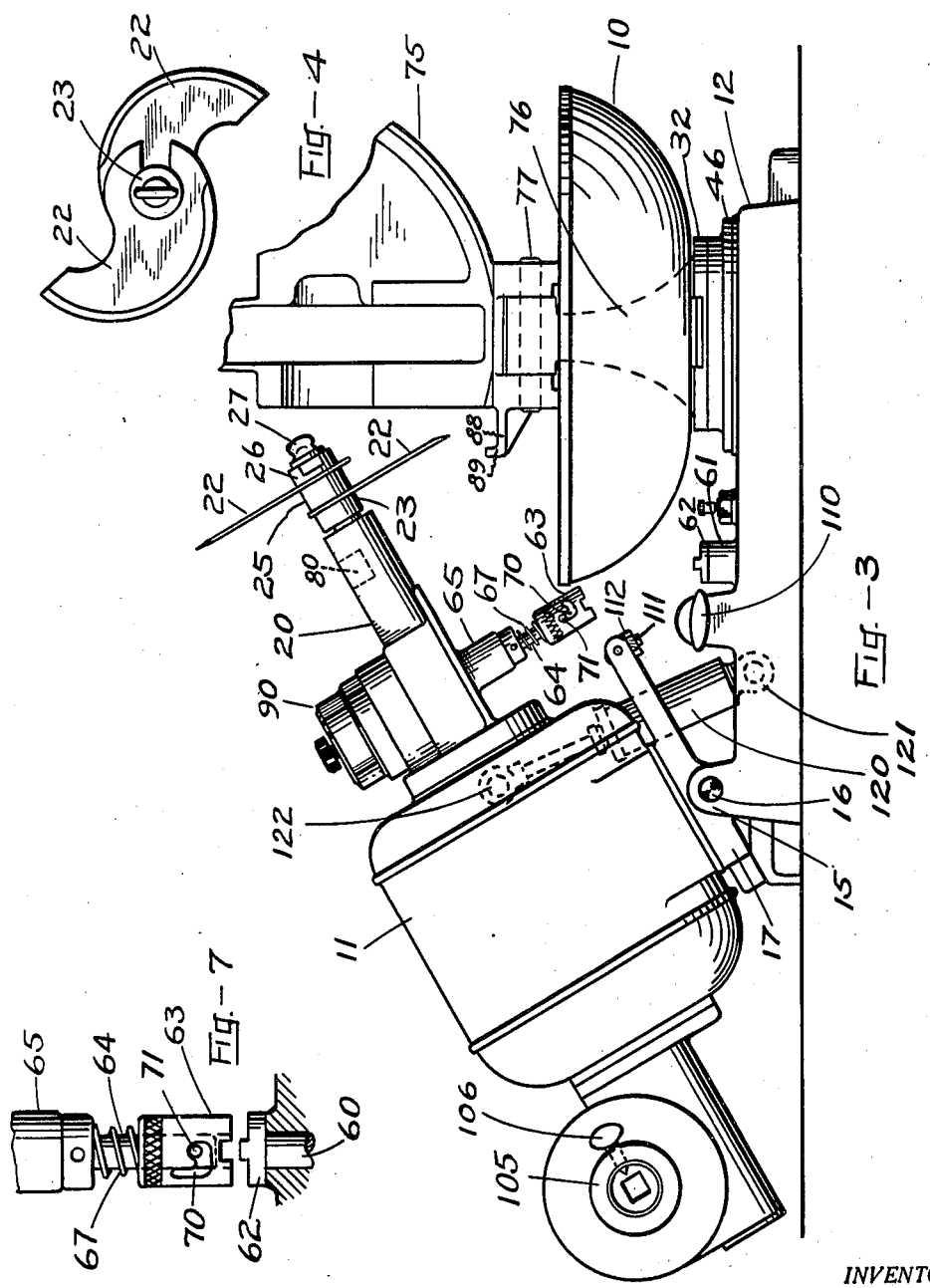

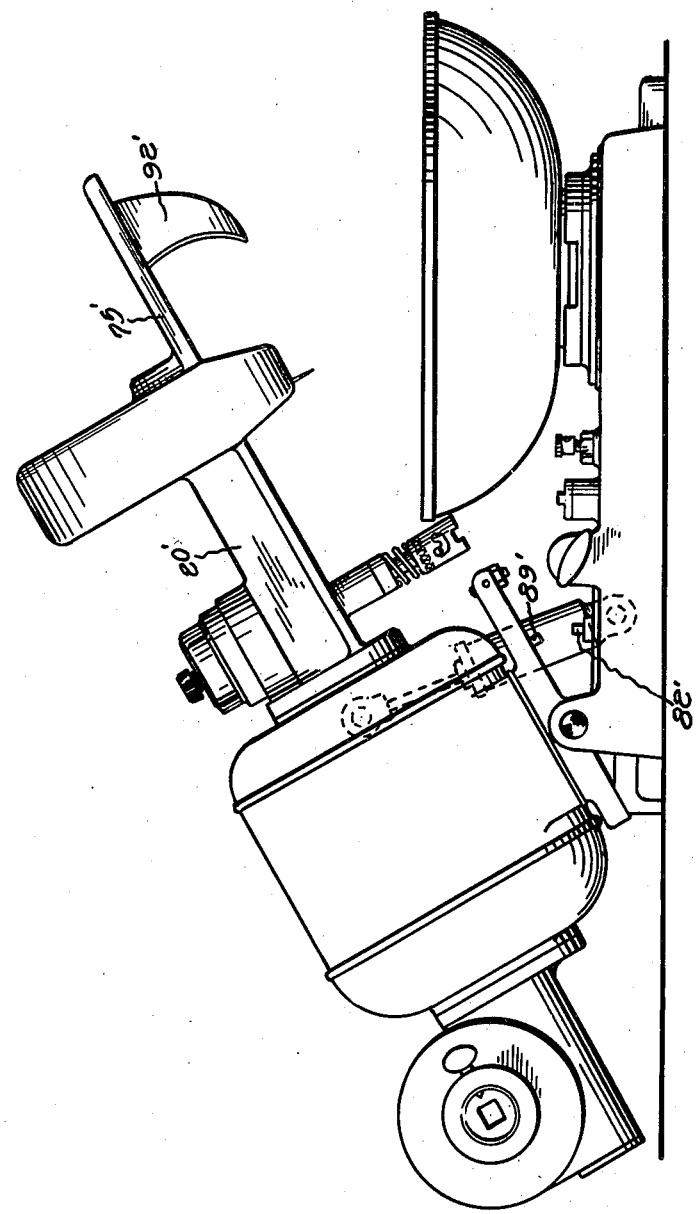

Patented Aug. 13, 1929.

1,724,598

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

APPARATUS FOR PREPARING FOODSTUFFS.

Application filed November 16, 1923. Serial No. 675,197.

This invention relates to cutting or agitating apparatus, and more particularly apparatus of this character which is motor operated.

One of the principal objects of the invention is to provide apparatus of this character which is simple in construction and easy and safe of operation.

Another object of this invention is to provide apparatus of this character which is so constructed that the various parts thereof may be readily manipulated to facilitate handling during operation of the device.

Other objects and advantages of the invention will be apparent from the description thereof set out below, when taken in connection with the accompanying drawing.

In the drawing, in which like characters of reference designate like parts throughout the several views thereof, Fig. 1 is a side view of a form of apparatus embodying this invention, with certain parts thereof shown in elevation, and certain other parts shown in section, to more clearly illustrate the details of construction, the section being substantially along the line 1—1—1' of Fig. 2;

Fig. 2 is a plan view of the form of apparatus shown in Fig. 1;

Fig. 3 is a side elevation of this same form of apparatus with certain of the parts shown in inoperative position;

Fig. 4 is a detail side elevation of the cutting knives which constitute a part of the apparatus shown herein as forming one embodiment of the invention;

Fig. 5 is a horizontal sectional view along the line 5—5 of Fig. 1;

Fig. 6 is a detail view of an automatic switch forming a part of the invention, parts thereof being shown in section to more clearly illustrate the construction;

Fig. 7 is a fragmentary view, in elevation, of a clutch forming one element of the illustrated form of invention; and Fig. 8 is a view showing a slightly modified form of construction.

As illustrating a preferred embodiment of the invention there is shown in the drawing what is, for purposes of convenience, called a "silent cutter"; which apparatus is intended for chopping meat, vegetables, or the like, preliminary to further treatment in the preparation of food. This invention, however, is not limited in its application to a silent cutter, but may be used in connection with any other form of cutting or agitating mechanism, such for example as apparatus for whipping cream, freezing ice cream, or the like.

The apparatus illustrated consists generally of a container mechanism including a bowl or container designated by the numeral 10, adapted to receive the meat or vegetables to be cut, or the cream or the like which is to be beaten or agitated; and a motor designated by the numeral 11, positioned adjacent thereto and constructed to operate suitable cutting knives or agitating mechanism operating within the bowl or container, the two being so mounted with relation to each other that they may be relatively moved to withdraw the knives or agitating mechanism out of the bowl to permit ready access thereto. It is not necessary that the motor and the bowl be mounted upon the same base, so long as they are mounted in some definite relationship with respect to each other; but preferably they are both mounted upon a base which is designated by the numeral 12. Projecting upwardly from the base are two standards 15, within each of which is journaled a trunnion or pivot 16, carried by a sub-base 17 upon which the motor 11 is rigidly mounted. The construction is such that the motor is pivotally mounted with respect to the base, the pivots being, preferably, horizontally arranged so that the motor may be tilted about the axis of said pivots or trunnions.

Attached to the motor and extending therefrom to overhang the bowl or container is a housing 20, within which is rotatably mounted an extension of the drive shaft of the motor, designated by the numeral 21. This extension of the drive shaft may be integral with the shaft, or, as shown in the drawing, it may be a separate piece which is connected to the drive shaft by means of a suitable sleeve, or other type of coupling. Suitably mounted upon the free end of this extension 21 are two cutting knives, 22, which, as shown particularly in Fig. 4, are curved, knives of this shape having been found quite effective in operation. These knives are preferably mounted upon a sleeve 23, rather than directly upon the shaft itself, this sleeve being cut away as shown to form a shoulder 24 against which one of the knives rests. The other knife, which is preferably located substantially diametrically opposite the first named knife, is spaced from that first named knife by means of a spacing ring 25, both knives and the spacing ring being securely held in place on the sleeve 23 by means of a locking ring 26, which is threadedly mounted on said sleeve. The sleeve 23, with the knives assembled thereon is locked upon the shaft 21, and held so as to rotate with that shaft, by means of suitable retaining mechanism, such as the thumb screw 27 which is threadedly connected to the shaft in any suitable manner.

As stated above this invention is not limited to a cutting device, and the free end of the shaft 21 may be constructed to operate any desired form of cutting mechanism other than that shown, or any desired form of beater, stirrer or other agitator; it being obvious that merely slight mechanical variations of construction will accommodate this device to other types of cutting mechanism or to beating, stirring or agitating mechanism. And, of course, the bowl 10 might be instead a jar, ice cream bucket, or the like.

The bowl 10 is preferably made rotatable. This bowl carries upon the base thereof a depending circular flange 30, provided with laterally extending lugs or extensions 31, which are spaced from each other. Cooperating with the bowl 10, and adapted to receive the lugs 31 is a member 32, which is provided with upstanding spaced arcuate extensions 33 each of which has a lug 34 carried thereby; the construction of the lower part of the bowl, and of this member 32, being such that the lugs 31 may be brought into register with the spaces between the arcuate extensions 33 so that the bowl may be placed in position with the cylindrical flange 30 positioned within the said extensions 33, whereupon partial rotation of the two members relative to each other will cause the lugs thereon to lock with each other to hold the bowl in position. One of the extensions 33 is provided, in a suitable place, with a screw 35, which may be positioned to limit the rotative movement of these two members relative to each other to lock the bowl in place.

The base 12 is preferably hollowed out as shown by the numeral 40 to receive a train of gears 41, 42 and 43. The base is also provided with an opening 45, through which access may be had to the interior thereof, which is provided with a cover 46 the upper face of which is provided with an upstanding flange or track 47 adapted to receive and support the member 32. This member 32 is provided with a hub 50, which extends down through a suitable flanged opening 51 in the cover 46. The hub 50 is provided with a passage 52 within which is mounted a shaft 53 which is keyed or held to the hub 50 in any desired manner. The lower end of this shaft is positioned within the hub of the gear 41 and is pinned thereto, so that rotation of the gear 41 will cause corresponding rotation of the member 32, and thus will cause rotation of the bowl 10. The upper end of the shaft 53 preferably extends beyond the upper face of the member 32 and is adapted for positioning within a socket 54, in the bottom of the bowl, thus providing an easy means for centering the bowl when the device is assembled.

The pinion or gear 43 is attached to a shaft 60, shown in dotted lines in Fig. 1, the upper end of which extends through a suitable bearing 61, mounted upon the top of the base 12. The upper end of this shaft 60 carries thereon a clutch member 62 which may be of any suitable character. Cooperating with the clutch member 62 is a spring pressed clutch member 63, which is slidably mounted upon a shaft 64, the upper end of which is journaled in a suitable bearing 65, which is in the form of a depending sleeve carried by the housing 20. The upper end of this shaft has mounted thereon a gear 68 which meshes with the worm 66, carried by the shaft extension 21. The shaft 64 is surrounded by a spring 67, which normally urges the two clutch members 62 and 63 into engagement with each other, so that as the motor operates the gear train 41, 42 and 43 will be actuated to cause rotation of the bowl 10. The clutch member 63, which is in the general form of a sleeve, loosely mounted upon the shaft 64, is provided with a bayonet slot 70, which receives a pin 71, carried by the shaft. With the parts positioned as shown in Fig. 1 the construction is such that the spring 67 will urge the two clutch members into driving engagement. If desired the clutch member 63 may be moved longitudinally of the shaft 64 and then given a part turn in which case the pin will hold the clutch member 63 out of engagement with the clutch member 62, and against the tension of the spring; so that the motor may be operated without causing rotation of the bowl, as shown in Fig. 7.

The container mechanism preferably includes a cover, or part cover, 75, for the container, which serves to prevent the material therein from being forced over the edge during operation of the device. With a device such as shown, no particular benefit is derived from covering more than half of the bowl, for as the cutting knives operate always in the same direction they tend to force the material in the bowl in a given direction and therefore a cover need be provided only for that part of the bowl toward which the material is forced. This cover is mounted upon a suitable standard 76, (shown partly in dotted lines in Fig. 3) which is in turn mounted upon member 46 and is integral therewith, the cover being hinged to this standard by means of the hinge pin 77, so that it may be swung to a substantially vertical position to permit complete access to the bowl and to permit of ready removal of the bowl from the base. This cover is provided with a centrally arranged upward extension 78, which provides a substantially semi-circular pocket within which the knives are enclosed when the cover is in lowered position, so that all danger of injury from contact with the knives is prevented, so long as the cover is in lowered position. But if the cover is left in upwardly swung position then the knives are uncovered. In order to prevent the possibility of any injury due to the operator carelessly leaving the cover open while the device is operating, means is provided for preventing rotation of the knives unless the cover is in lowered position, to enclose the knives.

This means preferably consists of an automatically operated switch, within the motor circuit, the general arrangement of the switch being shown in Fig. 2, and the details of construction thereof in Fig. 6. This switch, as shown particularly in Fig. 6, comprises a hollow member 80, of insulating material, carrying two poles or terminals 81 which are connected within the motor circuit. Slidably mounted within the member 80 is a plunger 82, which has mounted thereon a guide member 83, also preferably of insulating material. Carried by this plunger 82 is a contactor 84, of conducting material, which is of such proportion that when the plunger 82 is suitably positioned the contactor will close the circuit across the two poles or terminals 81.

The plunger is surrounded by a spring 85, which as shown clearly in Fig. 6 bears at one end against the collar of insulating material fixed to the plunger and at the other end against the hollow member 80, thereby tending to urge the plunger to a position such as to hold the contactor out of contact with the terminals 81. The member 80 is preferably mounted within the housing 20, being attached to the wall of the housing by means of screws 86, or any other desired manner. This member may, however, be carried by any suitable fixed part of the apparatus. One end of the plunger 82 extends outwardly through the wall of the housing 20. Carried by the cover 75 is an extension 88 which has a lug 89 thereon. This extension and lug are so positioned, with respect to the outer end of the plunger 82, that when the cover is in lowered position,—i. e., in operating position—the lug 89 contacts with the plunger to force it, against the action of the spring 85, to close the circuit across the terminals 81 as shown in dotted lines in Fig. 6; but when the cover is moved to elevated, or inoperative, position then the lug 89 is moved out of contact with the plunger 82 to permit that plunger to move, under the action of the spring 85, to break the circuit across the terminals 81, to thus render the motor inoperative. This construction is such that it is impossible for the motor to operate when the cover is in elevated position and the knives thus uncovered,—a condition which would make operation dangerous.

Of course the motor is also provided with a conventional control switch 90, which may be of any suitable character.

The cover 75 has depending therefrom a curved scraper 92, which feeds the material toward the center of the bowl where it will be best operated upon by the knives.

Mounted upon the end of the motor, opposite to the end which carries the housing 20, is a second housing 100, within which is suitably journaled an extension 101 of the drive shaft of the motor. Carried by this extension 101 is a worm gear 102 meshing with a gear 103, which has a socket 104 in the hub thereof adapted to receive the shaft of a meat grinder or the like. Housing 100 has an extended socket 105 which is adapted to receive and hold in operative position a meat grinder or the like, the set screw 106 serving to lock the meat grinder in place. The single motor 11, may thus serve to operate cutting knives, such as are shown and described, or agitating mechanism of any desired sort, by means of the shaft extension 21, and also operate a meat grinder or the like by means of the shaft extension 101. If desired the motor may operate both these devices at once; or it may operate the cutting knives only, the meat grinder being removed; or it may operate the meat grinder only, the clutch member 63 being moved into inoperative position so that operation of the motor will not cause operation of the bowl.

The motor is preferably so mounted upon the base 12, that, with its associated parts, it is slightly unbalanced, with the end carrying the housing 100 slightly heavier than the end carrying the housing 20. Consequently the motor tends to normally tilt about its pivot to raise the cutting knife end of the apparatus. In order to hold the motor in position with the cutting knives or other mechanism carried by the shaft extension 21 in position to operate within the bowl, the base 12 is provided with a set screw 110, which cooperates with an extension of the sub-base 17 to hold the motor against tilting about its pivot. The sub-base is preferably also provided with a set screw or bolt 111, which serves as a stop to limit tilting of the motor in one direction. This bolt 111 may be suitably manipulated to give the desired positioning of the motor, and its associated parts, after which the motor is locked against tilting by means of the set screw 110. A lock nut 112 is also provided for holding the screw 111 against accidental movement. The sub-base, at its opposite end, is provided with an extension 113, which is adapted to cooperate with a flattened portion 114 of the base, which serves as a stop to limit tilting movement of the motor in the opposite direction.

In Figs. 1 through 7, and as described above, the cover is hingedly supported by the base member so that it may be moved independently of the tilting of the motor. With this construction it is intended that the cover shall be moved by the operator before the motor is tilted. But it may some time occur that the operator, through carelessness or forgetfulness, will attempt to tilt the motor without first lifting the cover. In such case the tilting of the motor would of itself cause the cover to swing upwardly thus actuating the automatic switch to break the circuit to stop the operation of the motor and so of the knives. If the movable clutch member 63 is in operative position, then tilting of the motor effects disengagement of this movable clutch member from the fixed clutch member 62, while at the same time the motor circuit is broken. Thus actuation of both the knives and the bowl or container is automatically interrupted upon tilting of the motor or raising of the cover of the container.

In Fig. 8 is shown a slightly modified form of construction in which the cover 75' is connected to the motor housing 20' so that the motor and cover will move together. In this construction the lug 89' and the automatic switch are so arranged that as the motor is tilted upwardly to remove the knives from the bowl, the cover being at the same time carried upwardly, the lug 89' will be moved out of contact with the plunger 82' of the automatic switch so that the motor circuit will be broken. And as the motor is tilted in the opposite direction to move the knives back into the bowl and to position the cover over the bowl, the lug 89' will actuate the plunger of the automatic switch to close the motor circuit.

The apparatus is preferably so constructed that the motor, and its associated parts, are only slightly unbalanced, or even substantially in balance, when the meat grinder is not positioned within the housing 100. Therefore when the housing 100 does support the meat grinder, or similar device, the motor and its parts will be decidedly unbalanced and when released would tend to swing rapidly about the motor pivots, with possible resulting damage to the apparatus, and possible injury to the attendant as the result of the rapid upward movement of the knives. In order to prevent this a dashpot 120, is provided, one end of which is connected to the base, as shown in dotted lines in Fig. 3 by the numeral 121, the other end being connected to the motor as shown in dotted lines by the number 122. This serves to prevent rapid swinging of the motor about its pivot in either direction.

When it is desired to operate the cutting end of the device the material to be treated is placed in the bowl 10, the cover being at the time in elevated position, with the motor tilted to bring the knife into upward position so that the bowl may be readily removed. The bowl having been filled is then placed in position. The motor is swung about its pivot until further movement is checked by the abutment screw 111, at which time the clutch members 62 and 63 will be engaged. The set screw 110 is then manipulated to lock the motor in this position. In the modification shown in Fig. 8 this downward movement of the motor of itself causes closing of the motor circuit to start operation of the knives and bowl, but in the form of apparatus shown in Figs. 1 through 7 the cover 75 is then swung downwardly, the lug 89 contacting with the plunger 82 to close the motor circuit and start operation of the device. When it is desired to gain access to the bowl, or to remove the bowl, the cover is first swung upwardly, and then the motor tilted about its pivots, in the modification of Figs. 1 through 7; or the motor and cover are moved together, in the modification of Fig. 8, this upward movement moving the lug out of contact with the plunger of the automatic switch to break the motor circuit before the knives are exposed. Access to the interior of the bowl is then afforded, for filling or emptying the bowl being removed or not as desired.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus of the character described comprising a container mechanism including a container, a motor, a motor circuit therefor, means for operating within said container and actuated by said motor, said means being mounted for swinging motion to permit of moving the said means into operative position within the container or of removing the said means from the container, and means within the motor circuit comprising a switch cooperatively associated with a movable part of the container mechanism and so constructed that opening or closing of the switch is conditioned upon the relative positioning of the associated movable container mechanism part.

2. Apparatus of the character described comprising a container, a motor, means for operating within said container carried by said motor and actuated thereby, means for swinging said motor upon its base to remove the said operating means from said container, and automatic means for stopping operation of said motor as it is swung on its base.

3. Apparatus of the character described comprising a container mechanism including a container, a motor, a motor circuit therefor, means for operating within said container carried by said motor and actuated thereby, means for moving said motor to remove the said operating means from the container, and a switch within said motor circuit for effecting starting and stopping of the said motor, said switch being cooperatively associated with a movable part of the container mechanism whereby the switch may be closed to permit flow of current to the motor only when the motor and said movable container part are in operative position.

4. Apparatus of the character described comprising a container, a motor for rotating said container having a shaft overhanging said container and carrying means for operating upon foodstuffs in said container, and means for swinging said motor upon its base to permit removal of said container.

5. Apparatus of the character described comprising a detachably mounted container, cutting knives operating within said container, a motor, means operatively connecting said motor to said cutting knives, means actuated by said motor for causing rotation of the said container, and means for swinging the said motor and the said cutting knives together to permit removal of the container.

6. Apparatus of the character described comprising a base member, a container rotatably mounted thereon, a motor pivotally mounted upon said base adjacent said container, cutting knives supported by said motor to operate within the said container, means operatively connecting said motor to said cutting knives, means operatively connected to said motor for rotating the said container, the construction being such that the said motor and the knives carried thereby may be swung upon the said base to move the said knives out of operative position.

7. Apparatus of the character described comprising a container, a motor mounted adjacent said container and having its drive shaft extended to overhang said container, cutting knives mounted on said shaft and operating within the said container, means on the said motor shaft for causing rotation of the container as the cutting knives are rotated, and means permitting swinging said motor upon its base to move the said overhanging shaft and knives carried thereby, to permit removal of the container.

8. Apparatus of the character described comprising a container, means for operating upon foodstuffs within said container, a motor for actuating said operating means, means for moving said motor and operation means together to give access to the container, and automatic means for stopping operation of the said motor, said last-mentioned means being constructed to prevent actuation of said operating means when the latter is moved from its operative position within the container.

9. Apparatus of the character described comprising a container, a cover therefor, knives operating within said container, a motor for actuating said cutting knives, means for swinging said motor and cutting knives together to permit removal of the container, and a switch within the motor circuit constructed to automatically open to stop the motor as the cover is moved to give access to the container.

10. Apparatus of the character described comprising a rotatable container, a motor positioned adjacent said container and having its drive shaft extended to overhang said container, cutting knives mounted on said shaft, means on said shaft for causing rotation of the said container as the cutting knives are rotated, means for swinging said motor upon its base to move the said overhanging shaft and cutting knives to permit removal of the said container, and means for automatically stopping operation of the motor preliminary to its being thus swung upon its base.

11. Apparatus of the character described comprising a container, a base member, a motor pivotally mounted upon said base to swing about a horizontal pivot, said motor having an extended drive shaft overhanging said container, means mounted upon said shaft for operating within the said container, the construction being such that the motor may be tilted about this horizontal pivot to permit removal of the said container, and a dashpot associated with said motor for controlling tilting of said motor.

12. Apparatus of the character described comprising a container, a base member, a motor pivotally mounted thereon about a horizontally arranged pivot, said motor having its shaft extended to overhang said container, and constructed to actuate means operating within said container, the motor actuating means being so balanced that the motor normally tends to tilt about its pivot to swing the shaft and operating means associated therewith upwardly to move the said operating means out of operative position, and means for holding said motor in operative position against its normal tendency to tilt.

13. Apparatus of the character described comprising a container, a base member, a motor pivotally mounted thereon about a horizontally arranged pivot, said motor having its shaft extended to overhang said container, and constructed to actuate means operating within said container, the motor and operating means being so balanced that the motor normally tends to tilt about its pivot to swing the shaft and operating means associated therewith upwardly to move the said operating means out of operative position, means for holding said motor in operating position against its normal tendency to tilt, and a dashpot for controlling tilting movement of the said motor when said holding means is released.

14. Apparatus of the character described comprising a container, a base member, a motor pivotally mounted thereon about a horizontally arranged pivot, said motor having its shaft extended to overhang said container, and constructed to actuate means operating within said container, the motor and operating means being so balanced that the motor normally tends to tilt about its pivot to swing the shaft and operating means associated therewith upwardly to inoperative position, means for holding said motor in operating position against its normal tendency to tilt, and means for limiting the tilting movement of said motor.

15. Apparatus of the character described comprising a container, a base member, a motor pivotally mounted thereon about a horizontally arranged pivot, said motor having its shaft extended to overhang said container, and constructed to actuate means operating within said container, the motor actuating means being so balanced that the motor normally tends to tilt about its pivot to swing the shaft and operating means associated therewith upwardly to inoperative position to permit removal of the said container, means for holding said motor in operating position against the normal tendency to tilt, a dashpot for controlling tilting movement of the said motor when said holding means is released, and means for limiting swinging movement of said motor.

16. Apparatus of the character described comprising a container, a motor for rotating said container, cutting knives supported by said motor to operate within the said container, means for swinging said motor upon its base to swing said cutting knives out of the container to permit removal of said container, and means for limiting the swinging movement of said motor and cutting knives supported thereby.

17. Apparatus of the character described comprising a pivotally mounted motor, an extension upon each end of the drive shaft of said motor; cutting knives, for operating within a container, mounted upon one extended end of said drive shaft; and means upon the other extended end of the said drive shaft adapted for receiving in driving connection a meat grinder or the like, said means being constructed to partly counterbalance the motor.

18. Apparatus of the character described comprising a container, a pivotally mounted motor, an extension upon each end of the drive shaft of said motor, food treating means mounted upon one extended end of said drive shaft for operating within said container, means upon the other extended end of the said drive shaft adapted for receiving in driving connection a meat grinder or the like, the construction being such that said motor is partly counterbalanced by said food treating means and said receiving means whereby said motor tends to swing about its pivot to move said food treating means out of operative position within said container, and means for locking said motor against pivotal movement.

19. Apparatus of the character described comprising a container, a motor for rotating said container, means for swinging said motor upon its base to permit removal of said container, a driving connection between said motor and said container including clutch members actuated by the swingable motor parts to make or break the driving connection as the motor is swung upon its base respectively into operative or inoperative position.

20. Apparatus of the character described comprising a rotatable container, a motor positioned adjacent said container, a driving gear mounted upon the shaft of said motor, means cooperating with said gear for rotating the said container, comprising a clutch; means for swinging the said motor on its base to permit removal of the said container, the said clutch being constructed to automatically connect or disconnect said cooperating means and said drive gear as the motor is swung upon its base.

21. Apparatus of the character described comprising a base member, a rotatable container mounted thereon, operating gears associated with said container, a motor pivotally mounted on said base and mounted to tilt about a horizontal pivot, a drive gear carried by the shaft of the said motor, a driven gear and complementary clutch members associated with one of the gears for causing rotation of the said container, the construction being such that when the said motor is tilted in one direction about its horizontal pivot the two said clutch members will engage to cause driving of the rotatable container from the motor shaft, and when it is tilted in the opposite direction the two said clutch members will automatically disengage.

22. Apparatus of the character described comprising a container mechanism including a container having a movable part, a motor, a motor circuit therefor, means actuated by said motor for operating within said container, said operating means being movably mounted to permit of moving the said operating means into operative position within the container or of removing the said operating means from the container, a switch within the motor circuit, and switch control means cooperatively associated with said movable part of the container mechanism and so constructed that closing of the switch is conditioned upon the relative positioning of the associated movable container mechanism part.

23. Apparatus of the character described comprising a rotatable container, a base member positioned adjacent said container, a motor tiltably mounted on said base member, said motor having its shaft extended to overhang the said container, means carried by said shaft for operating within the said container, a contact member mounted upon the said base member, said member carrying two contacts located within the motor circuit, a plunger mounted within the said contact member, a contact piece carried thereby and adapted to close the circuit across the two contacts, a spring normally urging the plunger to hold the contact piece away from the said contact, and means associated with the said motor for moving the plunger against the action of the spring to close the circuit through said contacts.

24. Apparatus of the character described comprising a container, a cover therefor, a base member, a motor mounted thereon adjacent said container, means carried by said motor for operating within said container, a switch within the motor circuit carried by said base comprising a contact bearing plunger, means for normally urging said plunger in one direction to break the motor circuit, and means carried by the said cover for urging the said plunger in the opposite direction to close the motor circuit when the cover is in closed position.

25. Apparatus of the character described comprising a container, a motor having a drive shaft for rotating said container, means for swinging said motor drive shaft to permit removal of said container, and a driving connection between said motor drive shaft and said container including clutch members actuated upon the swinging of said motor drive shaft to operative or inoperative position to respectively make or break said driving connection.

26. A food treating apparatus comprising a container adapted to receive therein material to be operated upon, said container having a movable cover portion therefor, a motor actuated cutting knife within the container, and a switch in the motor circuit operably associated with said cover portion to render the motor inoperative upon movement of the cover portion to permit access to the container to prevent actuation of said cutting knife when thus exposed.

27. Apparatus of the character described comprising a container, means for operating within said container, a pivotally mounted motor operatively connected to said operating means, and adapted upon movement thereof to remove the operating means from the container, and control means associated with said motor for stopping operation of the motor and the operating means connected thereto as the mechanism is actuated to move the motor to inoperative position.

28. A food cutter of the character described comprising a frame member, a rotatable container mounted thereon, a motor, a shaft driven by said motor, cutting knives carried by said shaft for operating within said container, a driving connection for rotating said container driven by said motor, and clutch mechanism interposed in said driving connection, said clutch means comprising a fixed clutch member, a movable clutch member, means for causing said movable clutch member to move into engagement with said fixed clutch member, and means for temporarily disabling the clutch mechanism.

29. A food cutter of the character described comprising a motor, a first driven means adapted for rotating a container, a driving interconnection for said first driven means adapted to provide operation of the first driven means upon operation of the motor, a second driven means operated by said motor, a cutting knife carried by said second driven means adapted to operate within the container, an attachment connection carried by said food cutter, a third driven means positioned adjacent said attachment connection and adapted to be connected to a movable part of an attachment such as a meat grinder and the like, a driving interconnection for said third driven means adapted to provide operation of the said third driven means upon operation of the motor, and means for temporarily disconnecting said first mentioned driving interconnection from the said first driven means, whereby the said third driven means for the attachment may be driven by said motor without operating the said first driven means.

In testimony whereof I hereto affix my signature.

HERBERT L. JOHNSTON.